US011495986B2

(12) United States Patent
Kim et al.

(10) Patent No.: US 11,495,986 B2
(45) Date of Patent: Nov. 8, 2022

(54) METHOD OF CONTROLLING CHARGING OF BATTERY AND ELECTRONIC DEVICE TO WHICH THE METHOD IS APPLIED

(71) Applicant: Samsung Electronics Co., Ltd., Suwon-si (KR)

(72) Inventors: Byungwook Kim, Suwon-si (KR); Hyungjun Kwon, Suwon-si (KR); Jongkyu Lee, Suwon-si (KR); Jaemu Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 16/774,203

(22) Filed: Jan. 28, 2020

(65) Prior Publication Data

US 2020/0280205 A1 Sep. 3, 2020

(30) Foreign Application Priority Data

Feb. 28, 2019 (KR) ........................ 10-2019-0023937

(51) Int. Cl.
*H02J 7/00* (2006.01)
(52) U.S. Cl.
CPC .............................. *H02J 7/007182* (2020.01)
(58) Field of Classification Search
None
See application file for complete search history.

(56) References Cited

U.S. PATENT DOCUMENTS

| 5,545,969 A | * | 8/1996 | Hasegawa | H02J 7/008 |
| | | | | 320/152 |
| 5,635,813 A | * | 6/1997 | Shiga | H01M 10/48 |
| | | | | 320/DIG. 21 |

(Continued)

FOREIGN PATENT DOCUMENTS

| CN | 107666167 A | 2/2018 |
| EP | 2 180 573 A2 | 4/2010 |

(Continued)

OTHER PUBLICATIONS

International Search Report dated May 14, 2020, issued in International Patent Application No. PCT/KR2020/000764.

(Continued)

*Primary Examiner* — Arun C Williams
(74) *Attorney, Agent, or Firm* — Jefferson IP Law, LLP

(57) ABSTRACT

An electronic device is provided. The electronic device includes a housing, a power interface exposed through at least a portion of the housing to be connected to an external power source in a wired manner or disposed inside the housing to be connected to the external power source in a wireless manner, at least one battery disposed inside the housing and electrically connected to the power interface, a processor disposed inside the housing and operatively connected to the power interface, and a memory disposed inside the housing and operatively connected to the processor. The memory stores instructions that, when executed, causes the processor to, in a state in which an external power is supplied through the power interface, when a voltage of the battery reaches a first voltage value, lower the voltage of the battery to a second voltage value lower than the first voltage value by discharging the battery after a first time has elapsed from a time point at which the voltage of the battery reaches the first voltage value.

22 Claims, 10 Drawing Sheets

(56) References Cited

U.S. PATENT DOCUMENTS

| | | |
|---|---|---|
| 9,099,883 B2 | 8/2015 | Ahn et al. |
| 2001/0017531 A1* | 8/2001 | Sakakibara ......... H02J 7/00047 320/106 |
| 2002/0060554 A1 | 5/2002 | Odaohhara et al. |
| 2005/0134221 A1 | 6/2005 | Wanibuchi et al. |
| 2007/0090806 A1 | 4/2007 | Hoffer et al. |
| 2007/0139006 A1 | 6/2007 | Yasuhito et al. |
| 2009/0278406 A1* | 11/2009 | Hoffman ............... H02J 7/342 307/66 |
| 2010/0244770 A1 | 9/2010 | Yasuhito et al. |
| 2010/0244771 A1 | 9/2010 | Yasuhito et al. |
| 2011/0248670 A1* | 10/2011 | Yamazaki ........... H01M 10/425 320/107 |
| 2013/0249483 A1 | 9/2013 | Iida |
| 2014/0042961 A1 | 2/2014 | Lan |
| 2014/0042976 A1 | 2/2014 | Lan |
| 2014/0045003 A1 | 2/2014 | Liu et al. |
| 2016/0064986 A1 | 3/2016 | Langlinais et al. |
| 2016/0141893 A1 | 5/2016 | Lee et al. |
| 2016/0149270 A1 | 5/2016 | Albert et al. |
| 2018/0358837 A1* | 12/2018 | Sakakibara ............. B60L 53/20 |
| 2018/0375352 A1* | 12/2018 | Zheng ................. H02J 7/00036 |
| 2018/0375364 A1 | 12/2018 | Langlinais et al. |

FOREIGN PATENT DOCUMENTS

| | | |
|---|---|---|
| JP | H09-285024 A | 10/1997 |
| JP | 2001-095171 A | 4/2001 |
| JP | 3721690 B2 | 11/2005 |
| JP | 5410248 B2 | 2/2014 |

OTHER PUBLICATIONS

Extended European Office Action dated Jul. 22, 2020, issued in European Patent Application No. 20158411.7.

* cited by examiner

METHOD OF CONTROLLING CHARGING OF BATTERY AND ELECTRONIC DEVICE TO WHICH THE METHOD IS APPLIED

CROSS-REFERENCE TO RELATED APPLICATION(S)

This application is based on and claims priority under 35 U.S.C. § 119(a) of a Korean Patent Application number 10-2019-0023937, filed on Feb. 28, 2019, in the Korean Intellectual Property Office, the disclosure of which is incorporated by reference herein its entirety.

BACKGROUND

1. Field

The disclosure relates to a method of controlling charging of a battery and an electronic device to which the method is applied.

2. Description of Related Art

An electronic device separated from an external power source may operate for a predetermined time using a battery. In addition, the battery of the electronic device is charged when the electronic device is connected to the external power source, and may operate continuously.

The above information is presented as background information only to assist with an understanding of the disclosure. No determination has been made, and no assertion is made, as to whether any of the above might be applicable as prior art with regard to the disclosure.

SUMMARY

For example, when the electronic device continues to be connected to an external power source, charging and discharging may be repeated to maintain a full charged state of the battery. When the charging and discharging of the battery is repeatedly performed, damage to the battery may occur, such as shortening of life and swelling as well as heat generation.

Aspects of the disclosure are to address at least the above-mentioned problems and/or disadvantages and to provide at least the advantages described below. Accordingly, an aspect of the disclosure is to provide a method of controlling charging of a battery and an electronic device to which the method is applied.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a power interface exposed through at least a portion of the housing to be connected to an external power source in a wired manner or disposed inside the housing to be connected to the external power source in a wireless manner, at least one battery disposed inside the housing and electrically connected to the power interface, a processor disposed inside the housing and operatively connected to the power interface, and a memory disposed inside the housing and operatively connected to the processor. The memory stores instructions that, when executed, causes the processor to lower a voltage of the at least one battery to a second voltage value lower than the first voltage value by discharging the battery after a first time has elapsed from a time point at which the voltage of the at least one battery reaches the first voltage value when the voltage of the at least one battery reaches the first voltage value in a state in which an external power is supplied through the power interface.

In accordance with another aspect of the disclosure, an electronic device is provided. The electronic device includes a housing, a power interface connected to an external power source through the housing, a power management module electrically connected to the power interface, at least one battery that is charged by an external power supplied through the power management module, a processor operatively connected to the power interface, and a memory that stores instructions, wherein the processor may, when the instructions are executed, lower a voltage value corresponding to a fully-charged state according to set values in a stepwise manner whenever a connection holding time between the power interface and the external power source elapses section-wise threshold times after a voltage of the at least one battery reaches a voltage value at the fully-charged state in a state in which the external power source is connected to the power interface.

In accordance with another aspect of the disclosure, a method of controlling charging of a battery is provided. The method includes determining whether a connection holding time between a power interface and an external power source has elapsed longer than section-wise threshold times after a voltage of the battery reaches a voltage value corresponding to a fully-charged state in a state in which the external power source is connected to the power interface, and lowering the voltage value corresponding to the fully-charged state according to set values in a stepwise manner whenever the connection holding time elapses longer than the section-wise threshold times.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
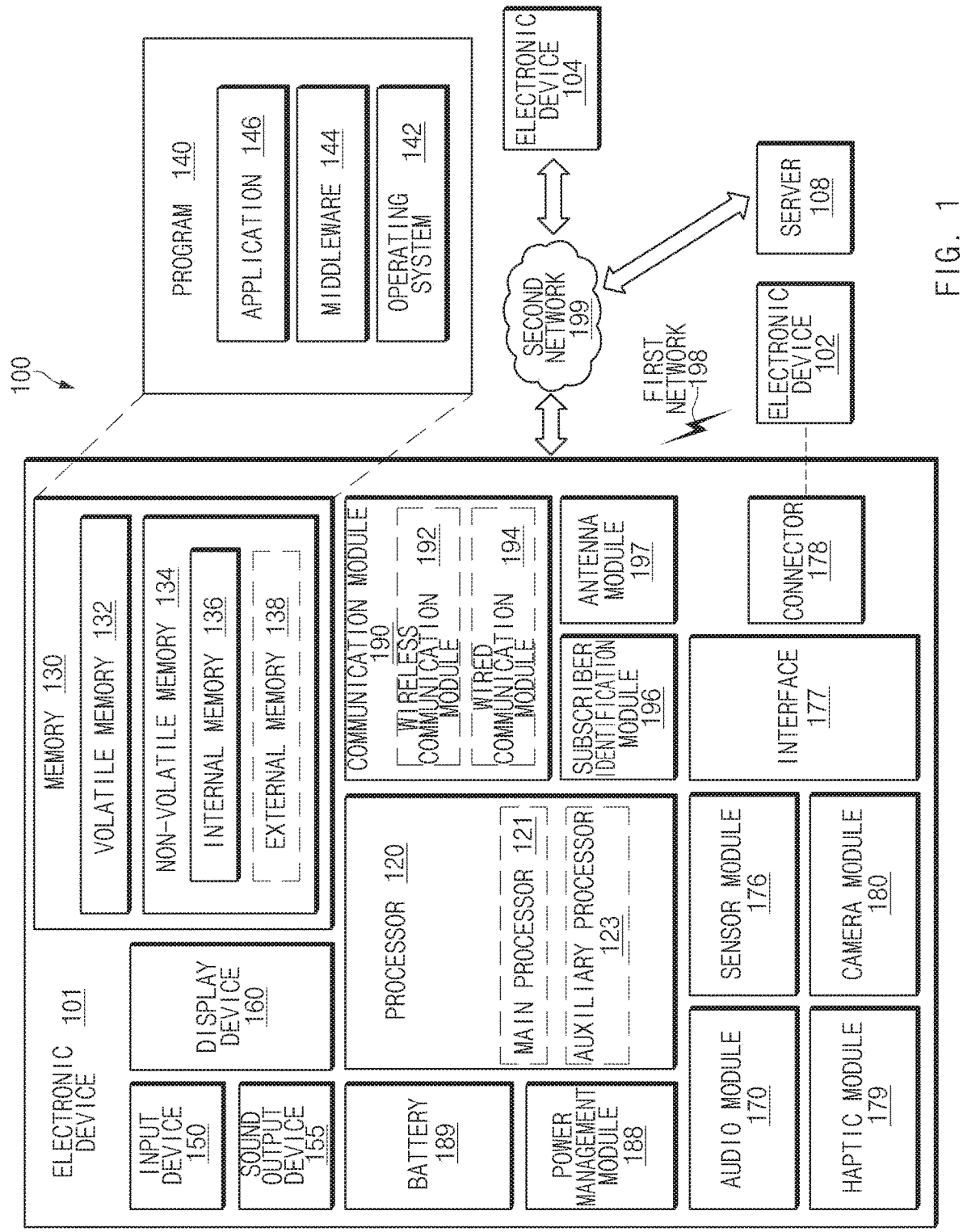
FIG. 1 is a block diagram illustrating an electronic device in a network environment according to an embodiment of the disclosure.

FIG. 1 is a block diagram illustrating an electronic device in a network environment 100 to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or headphones of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
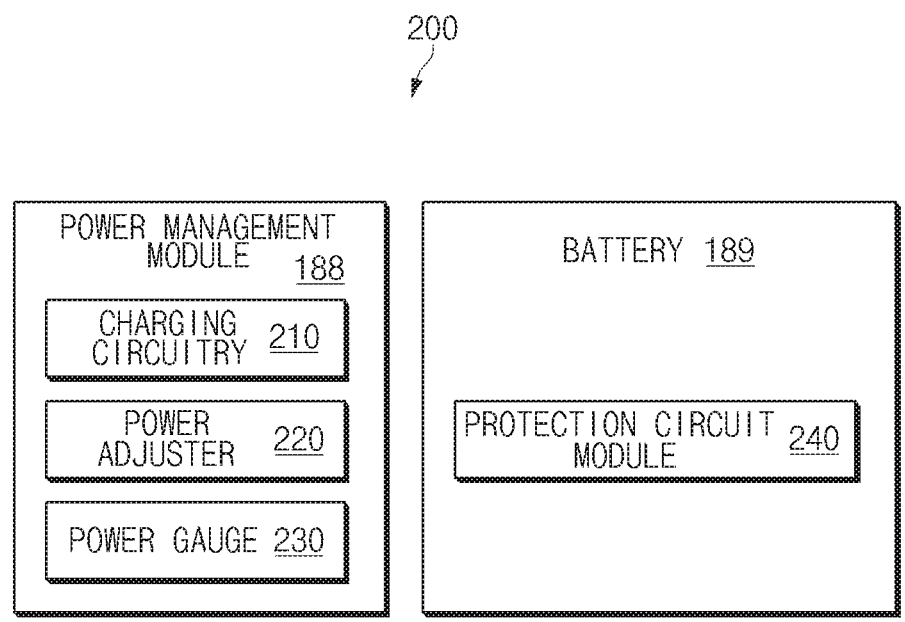
FIG. 2 is a block diagram illustrating a power management module and a battery according to an embodiment of the disclosure.

FIG. 2 is a block diagram 200 the power management module and the battery according to an embodiment of the disclosure.

Referring to FIG. 2, in a block diagram 200, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 watts or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
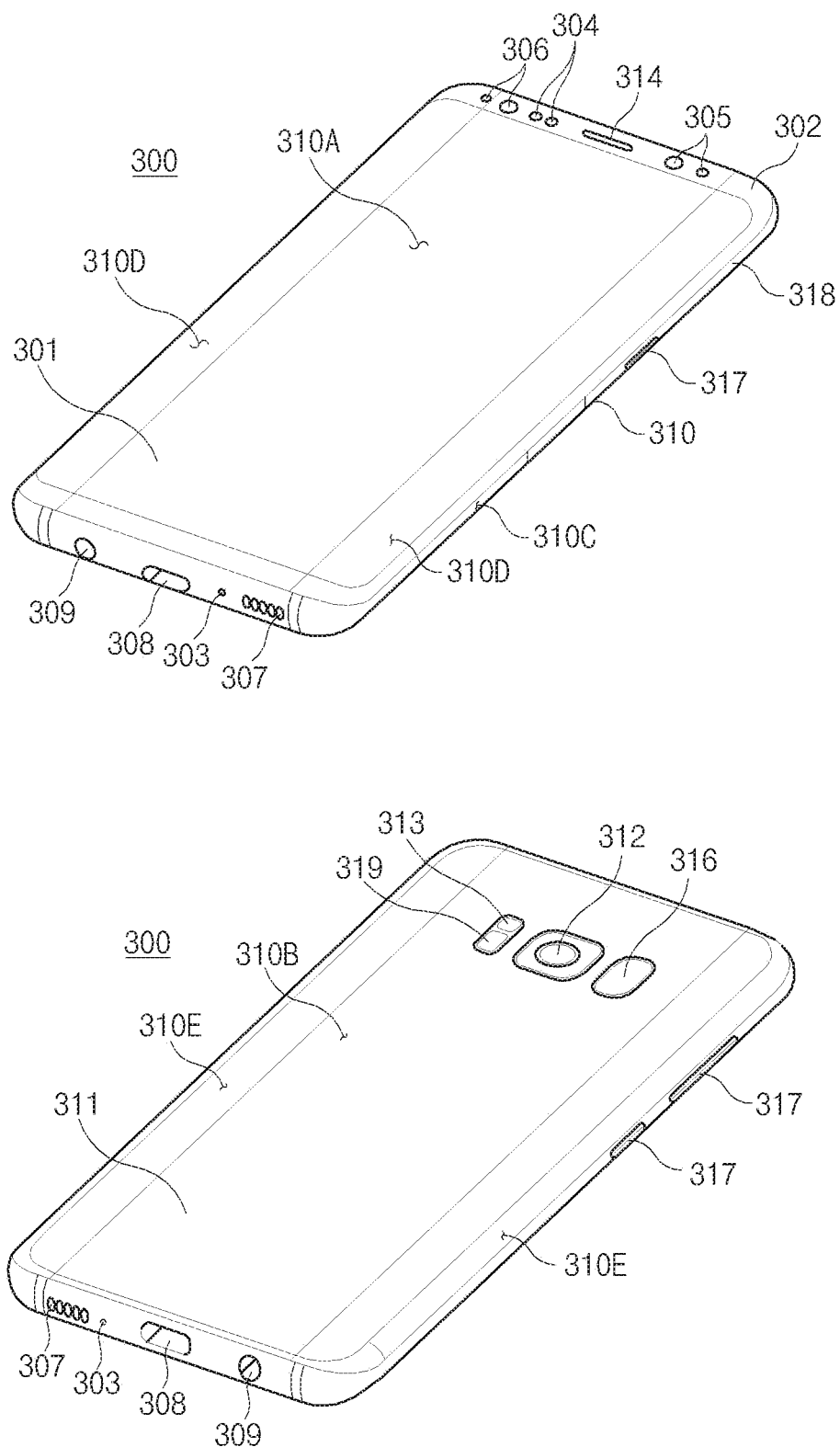
FIG. 3 is a perspective view illustrating a front surface and a rear surface of an electronic device according to an embodiment of the disclosure.

FIG. 3 is a perspective view illustrating a front surface and a rear surface of an electronic device according to an embodiment of the disclosure.

Referring to FIG. 3, an electronic device 300 according to an embodiment may include a housing 310 including a first surface (or front surface) 310A, a second surface (or rear surface) 310B, and a side surface 310C surrounding a space between the first surface 310A and the second surface 310B. In another embodiment (not shown), the housing may refer to a structure forming portions of the first surface 310A, the second surface 310B, and the side surface 310C in FIG. 1. According to one embodiment, the first surface 310A may be formed by a front plate 302 that is at least partially substantially transparent (e.g., a glass plate or a polymer plate including various coating layers). The second surface 310B may be formed by a substantially opaque rear plate 311. The rear plate 311 may be formed by, for example, coated or colored glass, ceramic, polymer, metal (e.g., aluminum, stainless steel (STS), or magnesium), or a combination of at least two of the above materials. The side surface 310C may be coupled to the front plate 302 and the rear plate 311, and may be formed by a side bezel structure (or "side member") 318 including metal and/or polymer. In some embodiments, the rear plate 311 and the side bezel structure 318 may be integrally formed and may include the same material (e.g., metal material such as aluminum).

In the illustrated embodiment, the front plate 302 may include two first regions 310D extending seamlessly by being bent from the first surface 310A toward the rear plate 311 at both long edge ends of the front plate 302. In the illustrated embodiment (see FIG. 3), the rear plate 311 may include two second regions 310E extending seamlessly by being bent from the second surface 310B toward the front plate 302 at both long edge ends of the rear plate 311. In a certain embodiment, the front plate 302 (or the rear plate 311) may include one of the first regions 310D (or the second regions 310E). In another embodiment, some of the first regions 310D or the second regions 310E may not be included. In the above embodiments, when viewed from the side of the electronic device 300, the side bezel structure 318 may have a first thickness (or width) on the side where the first regions 310D or the second regions 310E are not disposed and may have a second thickness thinner than the first thickness on the side where the first regions 310D or the second regions 310E are disposed.

According to one embodiment, the electronic device 300 may include at least one or more of a display 301, audio modules 303, 307, and 314, sensor modules 304, 316, and 319, camera modules 305, 312, and 313, a key input device 317, a light emitting device 306, and connector holes 308 and 309. In some embodiments, in the electronic device 300, at least one of the components (e.g., the key input device 317 or the light emitting device 306) may be omitted or another component may be included.

The display 301 may be exposed through, for example, a substantial portion of the front plate 302. In some embodiments, at least a portion of the display 301 may be exposed through the front plate 302 forming the first surface 310A and the first regions 310D of the side surface 310C. In some embodiments, the edges of the display 301 may be formed to be substantially the same in shape as outer edges of the front plate 302 adjacent thereto. In another embodiment (not shown), the distances between the outer edges of the display 301 and the outer edges of the front plate 302 may be formed substantially the same in order to expand an area where the display 301 is exposed.

In another embodiment (not shown), the screen display region of the display 301 may have a recess or opening in a portion thereof, and at least one or more of the audio module 314, the sensor module 304, the camera module 305, and the light emitting device 306 may be aligned with the recess or opening. In another embodiment (not shown), at least one of the audio module 314, the sensor module 304, the camera module 305, the fingerprint sensor 316, and the light emitting device 306 may be located behind the screen display area of the display 301. In another embodiment (not shown), the display 301 may be coupled or adjacent to a touch sensing circuit, a pressure sensor capable of measuring the strength (pressure) of a touch, and/or a digitizer for detecting a magnetic field-type stylus pen. In some embodiments, at least a part of the sensor modules 304 and 319 and/or at least part of the key input device 317 may be disposed in the first regions 310D and/or the second regions 310E.

The audio modules 303, 307, and 314 may include the microphone hole 303 and speaker holes 307 and 314. The microphone hole 303 may receive a microphone to obtain external sounds, and in some embodiments, a plurality of microphones to detect the direction of a sound. The speaker holes 307 and 314 may include the external speaker hole 307 and the phone receiver hole 314. In some embodiments, the speaker holes 307 and 314 and the microphone hole 303 may be implemented as one hole, or a speaker may be included without the speaker holes 307 and 314 (e.g., piezo speaker).

The sensor modules 304, 316, and 319 may generate an electrical signal or data value corresponding to an internal operating state or external environmental state of the electronic device 300. The sensor modules 304, 316, 319 may include the first sensor module 304 (e.g., a proximity sensor), a second sensor module (not shown) (e.g., a fingerprint sensor) disposed on the first surface 310A of the housing 310, the third sensor module 319 (e.g., a heart-rate monitor (HRM) sensor), and/or the fourth sensor module 316 (e.g., a fingerprint sensor) disposed on the second surface 310B of the housing 310. The fingerprint sensor may be disposed on the first surface 310A (e.g., the display 301) as well as the second surface 310B of the housing 310. The electronic device 300 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illuminance sensor.

The camera modules 305, 312, and 313 may include the first camera device 305 disposed on the first surface 310A of the electronic device 300, the second camera device 312 and/or the flash 313 disposed on the second surface 310B. The camera devices 305 and 312 may include one or more lenses, an image sensor, and/or an image signal processor. The flash 313 may include, for example, a light emitting diode or a xenon lamp. In some embodiments, two or more lenses (an infrared (IR) camera, a wide-angle lens, and a telescopic lens) and image sensors may be disposed on one surface of the electronic device 300.

The key input device 317 may be disposed on the side surface 310C of the housing 310. In another embodiment, the electronic device 101 may exclude all or some of the above-mentioned key input devices 317 and the excluded key input devices 317 may be implemented in other forms, such as soft keys, on the display 301. In some embodiments, the key input device may include the sensor module 316 disposed on the second surface 310B of the housing 310.

The light emitting device 306 may be disposed, for example, on the first surface 310A of the housing 310. The light emitting device 306 may provide, for example, state information of the electronic device 300 in the form of light. In another embodiment, the light emitting device 306 may provide a light source that interacts with the camera module 305, for example. The light emitting device 306 may include, for example, an LED, an IR LED, and a xenon lamp.

The connector holes 308 and 309 may include the first connector hole 308 for receiving a connector for transmitting or receiving power and/or data to/from an external electronic device and/or the second connector hole 309 (e.g., an earphone jack) for receiving a connector for transmitting or receiving audio signals to/from the external electronic device.

Figure 4:
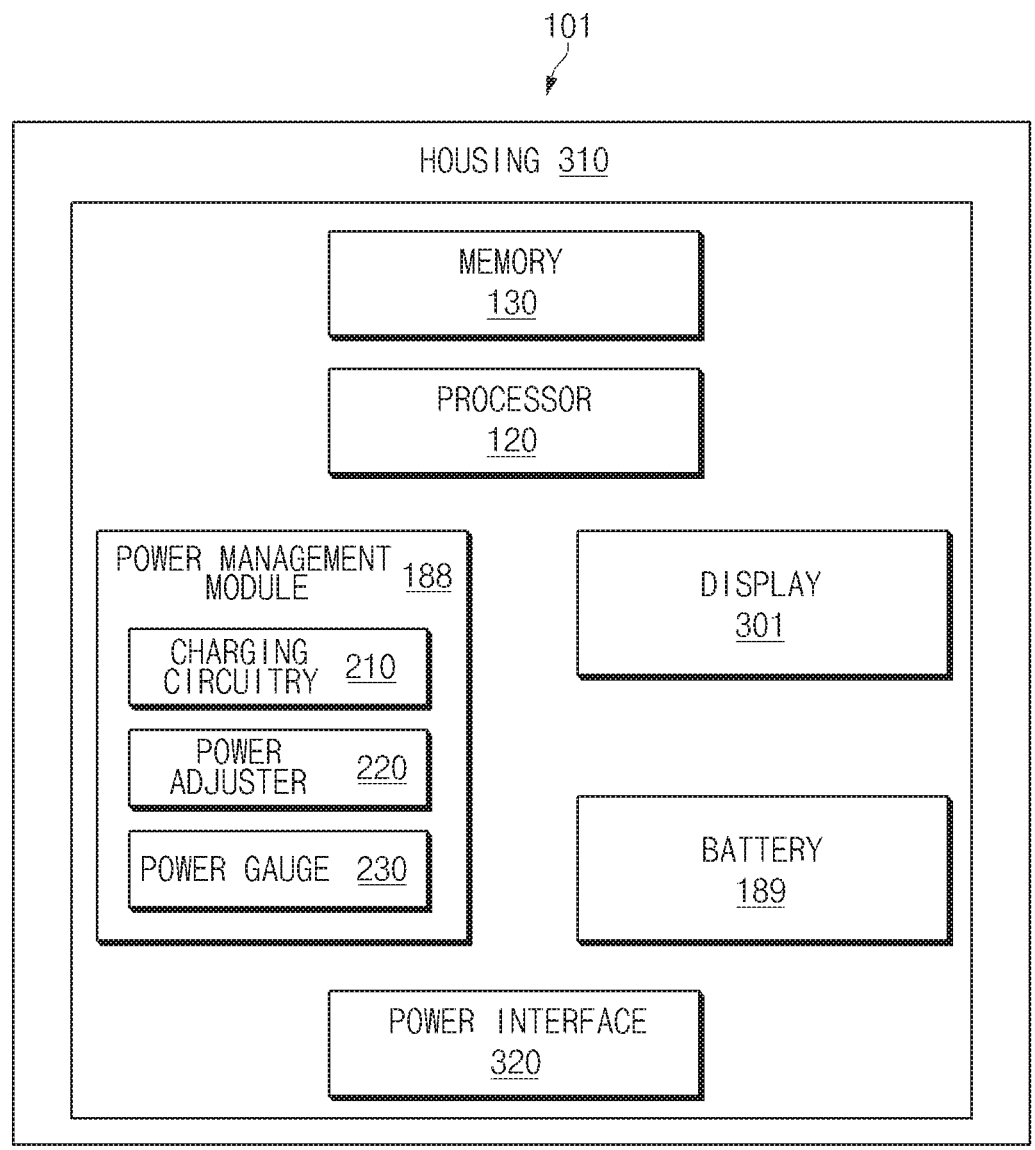
FIG. 4 is a block diagram of an electronic device according to an embodiment of the disclosure.

FIG. 4 is a block diagram of an electronic device according to an embodiment of the disclosure.

Referring to FIG. 4, the electronic device 101 (e.g., the electronic device 101 of FIG. 1 and/or the electronic device 300 of FIG. 3) according to an embodiment may include the housing 310, a power interface 320, the processor 120, the memory 130, the power management module 188, the battery 189, and the display 301 (e.g., the display device 160 of FIG. 1).

According to one embodiment of the disclosure, at least a portion of the housing 310 may form outer edges of the electronic device 101. For example, the housing 310 may include a front plate (e.g., the front plate 302 of FIG. 3) forming a front surface (or the first surface) of the electronic device 101, a rear plate forming a rear surface (or a second surface) of the electronic device 101, and a side member (e.g., the side member 318 of FIG. 3) surrounding a space between the front and rear plates. In addition, the housing 310 may protect the power interface 320, the processor 120, the memory 130, the power management module 188, the battery 189, and the display 301 from an external shock.

According to one embodiment, at least a portion of the power interface 320 may be exposed through at least a portion of the housing 310 to be connected to an external power source (e.g., a wired power source connected to a power adapter or a USB) in a wired manner, or may be disposed inside the housing 310 to be connected to an external power source (a wireless power source) in a wireless manner. The power interface 320 may include at least one, for example, a USB connector (e.g., the connecting terminal 178 of FIG. 1), a physical medium such as a power receiving coil (e.g., the antenna module 197 of FIG. 1), or a USB interface supporting a protocol (e.g., the interface 177 of FIG. 1).

According to one embodiment, the processor 120 located inside the housing 310 may be operatively connected to the power interface 320, the power management module 188, the battery 189, and the display 301. The processor 120 may monitor a time (e.g., a connection holding time) during which the external power source is connected to the power interface 320. In addition, the processor 120 may obtain usage state information of the battery 189 (e.g., the capacity, the number of charge/discharge cycles, the voltage or the temperature of the battery 189) through the charging circuitry 210 and the power gauge 230 of the power management module 188.

According to one embodiment, when a voltage of the battery 189 reaches a first voltage value while the external power is supplied through the power interface 320, the processor 120 may monitor a connection holding time between the power interface 320 and the external power source from a time point at which the voltage of the battery 189 reaches the first voltage value. For example, the processor 120 may determine whether the connection holding time has elapsed longer than a first time. For example, the processor 120 may lower the voltage of the battery 189 to a second voltage value lower than the first voltage value by discharging the battery 189 through the power management module 188.

According to one embodiment, the processor 120 may determine whether the voltage of the battery 189 reaches a voltage value corresponding to a fully-charged state in a state in which the external power source is connected to the power interface 320. For example, the processor 120 may monitor a connection holding time from a time point at which the voltage of the battery 189 reaches the voltage value (e.g., a first voltage value) corresponding to the fully-charged state in a state in which the external power source is connected to the power interface 320. The processor 120 may determine whether the connection holding time has elapsed longer than section-wise threshold times. The processor 120 may lower the voltage value corresponding to the fully-charged state according to set values when the connection holding time elapses longer than the section-wise threshold times. The voltage value corresponding to the fully-charged state may correspond to, for example, a set value that is lowered in a stepwise manner whenever the connection holding time elapses longer than section-wise threshold times. For example, the section-wise threshold times may be set for each time point at which a predetermined section ends (or starts) while a time is accumulated from the start of the connection holding time.

According to one embodiment, the processor 120 may determine whether a voltage of the battery 189 corresponds to the voltage value at the fully-charged state when the connection holding time elapses longer than at least one of the section-wise threshold times. When the connection holding time elapses longer than a first threshold time, the processor 120 may lower the voltage value corresponding to the fully-charged state according to the set values when the voltage of the battery 189 is greater than the voltage value at the fully-charged state (for example, 4.33 V).

According to one embodiment, the processor 120 may block an external power supplied from the power management module 188 to the battery 189 and an external power supplied from the power management module 188 to the display 301 whenever the connection holding time elapses longer than the section-wise threshold times. For example, the processor 120 may control the power management module 188 such that a discharge current is supplied to the display 301 or the processor 120 through the battery 189 as a driving current. According to various embodiments, the processor 120 may control the power management module 188 such that a discharge current is supplied through the battery 189 as a driving current for at least one of components (e.g., Wi-Fi, CP, AP, BT, or LED) of the electronic device.

According to one embodiment, the processor 120 may determine whether the voltage of the battery 189 reaches a set value one-level lower than a voltage value corresponding to a fully-charged state of one of the section-wise threshold times. When the voltage of the battery 189 reaches the set value one-level lower than the voltage value corresponding to the fully-charged state of any one threshold time, the processor 120 may control the power management module 188 such that an external power supplied to the battery 189 is maintained to be blocked. In addition, when the voltage of the battery 189 reaches the set value one-level lower than the voltage value corresponding to the fully-charged state of any one threshold time, the processor 120 may control the power management module 188 such that an external power is supplied to the display 301 or the processor 120.

According to one embodiment, when at least one of set conditions is satisfied, the processor 120 may continue to accumulate the connection holding time even when the external power source is not connected through the power interface 320. For example, when the external power source is disconnected from the power interface 320, and is then reconnected through the power interface 320 within a set time (e.g., 2 hours), the processor 120 may continuously accumulate the connection holding time. For example, when the external power source is disconnected from the power interface 320, and is then reconnected through the power interface 320 in a state in which the voltage of the battery 189 is not lowered below a set voltage (e.g., 4.15 V), the processor 120 may continuously accumulate the connection holding time. In another example, for example, when the external power source is disconnected from the power interface 320, and is then reconnected through the power interface 320 in a state in which a voltage level of the battery 189 is not lowered below a set level (e.g., 80%), the processor 120 may continuously accumulate the connection holding time.

According to various embodiments, stage-wise set values at fully-charged states according to the section-wise threshold times may be given as the example of Table 1. Table 1 below shows stage-wise set values and stage-wise charge-triggering voltage values at fully-charged states according to the section-wise threshold times.

TABLE 1

| Threshold time | Set value at fully-charged state(V) | Charge-triggering voltage value(V) |
|---|---|---|
|  | 4.35 | 4.28 |
| T1 | 4.33 | 4.26 |
| T2 | 4.31 | 4.24 |
| T3 | 4.29 | 4.22 |
| T4 | 4.24 | 4.17 |

Referring to Table 1, after the voltage of the battery 189 reaches the voltage value corresponding to the fully-charged state (e.g., 4.35 V), the processor 120 may determine whether the connection holding time has elapsed longer than threshold times. The processor 120 may lower the voltage value corresponding to the fully-charged state according to the set values when the connection holding time elapses longer than the threshold times. For example, when the connection holding time elapses longer than a first threshold time (e.g., T1) after the voltage of the battery 189 reaches a voltage value (e.g., 4.35 V) corresponding to a first fully-charged state, the processor 120 may lower the voltage value corresponding to the first fully-charged state to a first set value (e.g., 4.33 V). For example, when the connection holding time has elapsed longer than all the section-wise threshold times and a voltage value corresponding to the fully-charged state reaches a set value (e.g., 4.24 V) at the lowest stage, the processor 120 may maintain a voltage value corresponding to the fully-charged state to be maintained at the lowest stage or to be restored to a set value at the highest stage (e.g., 4.35 V) whether the power interface 320 is connected to an external power source. According to one embodiment, the charge-triggering voltage value representing that the voltage of the battery 189 is the minimum voltage value at which charging is able to be started may be lowered from a first charge-triggering voltage value (4.28 V) to a fourth charge-triggering voltage value (e.g., 4.17 V) in proportional to the voltage value at the fully-charged state, which is lowered according to the set values.

According to one embodiment, the threshold times (e.g., T1 to T4) in Table 1 may be converted into cumulative numbers of times by counting a set time (e.g., 172.8 seconds) as one time. For example, a first threshold time T1 may represent a result of accumulation of the set time (e.g., 172.8) by a set number of times (e.g., 300 times). For example, a second threshold time T2 may represent a result of accumulation of the set time (e.g., 172.8) by a set number of times (e.g., 400 times). For example, a third threshold time T3 may represent a result of accumulation of the set time (e.g., 172.8) by a set number of times (e.g., 700 times). For example, a fourth threshold time T4 may represent a result of accumulation of the set time (e.g., 172.8) by a set number of times (e.g., 1000 times).

According to one embodiment, the memory 130 disposed inside the housing 310 may be operatively connected to the processor 120. For example, the memory 130 may store a variety of data (e.g., instructions) used by the processor 120. The variety of data stored in the memory 130 may be transferred to the processor 120 at, for example, a request of the processor 120, or may be extracted by access of the processor 120 and executed in the processor 120.

According to one embodiment, the power management module 188 may include the charging circuitry 210, the power adjuster 220, and the power gauge 230. The power management module 188 may be implemented with, for example, a power management integrated circuit (PMIC). In addition, the power management module 188 may control charging and discharging of the battery 189 according to a command of the processor 120. For example, the power management module 188 may supply external power supplied through the power interface 320 to the battery 189 according to a command of the processor 120.

According to one embodiment, the power management module 188 may switch the battery 189 to a discharge state by blocking an external power supplied to at least one of the components of the electronic device 101 (e.g., the display 301), and supplying a power from the battery 189 to at least one of the components of the electronic device 101, according to a command of the processor 120.

According to one embodiment, the power management module 188 may release the discharge state of the battery 189 by supplying an external power to at least one of the components of the electronic device 101 in a state in which the external power supplied to the battery 189 is blocked, according to a command of the processor 120.

According to one embodiment, at least one battery 189 disposed inside the housing 310 may be electrically connected to the power interface 320 through the power management module 188. The battery 189 may be charged by an external power supplied from the power management module 188.

According to one embodiment, when instructions are executed in the processor 120, an external power supplied to the battery 189 from the power management module 188 may be blocked. In addition, when instructions are executed in the processor 120, a discharge current may be generated to enable the voltage of the battery 189 to reach a set value one-level lower than a voltage value corresponding to a fully-charged state of one of the section-wise threshold times. For example, the discharge current generated according to the discharge state of the battery 189 may be used as a driving current of at least one of the components of the electronic device.

According to one embodiment, when instructions are executed in the processor 120, the discharge current may not be generated in the battery 189 by releasing the discharge state while the external power from the power management module 188 is being blocked.

According to one embodiment, the display 301 may be electrically connected to the power management module 188 and the battery 189. The display 301 may be operated by an external power supplied from the power management module 188 or a discharge current supplied from the battery 189. For example, the display 301 may provide visual information to the outside (e.g., a user) of the electronic device 101.

According to one embodiment, when instructions are executed in the processor 120, the external power supplied from the power management module 188 may be blocked in the display 301. In addition, when instructions are executed in the processor 120, the display 301 may be operated by the discharge current supplied from the battery 189 instead of the external power supplied from the power management module 188.

According to one embodiment, the discharge current supplied from the battery 189 to the display 301 may be blocked when the voltage of the battery 189 reaches a set value at a desired stage (e.g., stage-wise set values at fully-charged states in Table 1). In addition, when the instructions are executed in the processor 120, the display 301 may be operated by an external power supplied from the power management module 188 again.

According to an embodiment, the display 301 may display a battery level of a predetermined level (e.g., 100%) through a user interface, whenever the section-wise threshold times elapse, although the voltage of the battery 189 is gradually lowered according to stage-wise set values at a fully-charged state corresponding to the section-wise threshold times. For example, although the connection holding time elapses longer than a first threshold time and the voltage of the battery 189 is lowered to a second set value (e.g., 4.33 V) corresponding to a second fully-charged state from a first set value (e.g., 4.35 V) corresponding to a first fully-charged state, the display 301 may display a battery level of 100% through the user interface.

Figure 5:
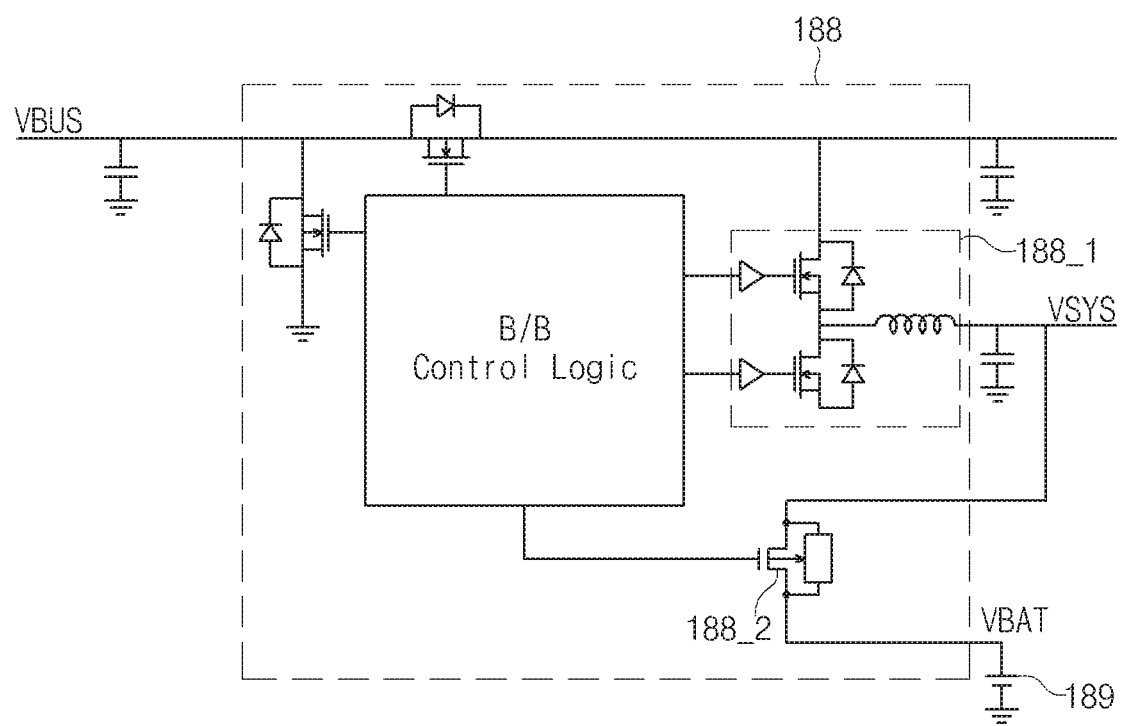
FIG. 5 is a circuit diagram of an electronic device according to an embodiment.

FIG. 5 is a circuit diagram of an electronic device according to an embodiment of the disclosure.

Referring to FIG. 5, the electronic device 101 (e.g., the electronic device 101 of FIG. 4) according to an embodiment may supply an external power VBUS supplied through a power interface (e.g., the power interface 320 of FIG. 4) for a system power VSYS and/or a battery voltage VBAT through the power management module 188 (e.g., PMIC). The system power VSYS may include, for example, a current for driving at least one of the components of the electronic device 101 (e.g., the display 301 of FIG. 4).

According to one embodiment, the power management module 188 may include a buck converter 188_1 (e.g., the power adjuster 220 of FIG. 4) and a switching element

188_2. The buck converter 188_1 may be set to an ON state or an OFF state under the control of a processor (e.g., the processor 120 of FIG. 4). When the buck converter 188_1 is set to the OFF state under the control of the processor, the switching element 188_2 may be set to an ON state opposite to the OFF state of the buck converter 188_1. In addition, when the buck converter 188_1 is set to the ON state under the control of the processor, the switching element 188_2 may be set to an OFF state opposite to the ON state of the buck converter 188_1.

According to one embodiment, the buck converter 188_1 may be set to the OFF state under the control of the processor, and thus the external power VBUS supplied for the system power VSYS and the battery voltage VBAT may be blocked. When the buck converter 188_1 is set to the OFF state under the control of the processor, the switching element 188_2 may be set to the ON state. In addition, when the switching element 188_2 is set to the ON state under the control of the processor, the battery voltage VBAT may be switched to the discharge state, and a discharge current may be generated. For example, the discharge current of the battery voltage VBAT may be supplied to the system power VSYS (e.g., the display 301 of FIG. 4).

According to one embodiment, the buck converter 188_1 may be set to the ON state under the control of the processor, so that the external power VBUS may be supplied to the system power VSYS. When the buck converter 188_1 is set to the ON state under the control of the processor, the switching element 188_2 may be set to the OFF state. In addition, when the switching element 188_2 is set to the OFF state under the control of the processor, the discharge state of the battery voltage VBAT may be released.

According to one embodiment, the instructions may be executed in the processor according to the section-wise threshold times (e.g., <Table 1> inserted to the description of FIG. 4), so that the battery voltage VBAT may be subjected to repetitive charging and discharging according to stage-wise set values at fully-charged states (e.g., <Table 1> inserted to the description of FIG. 4).

Figure 6:
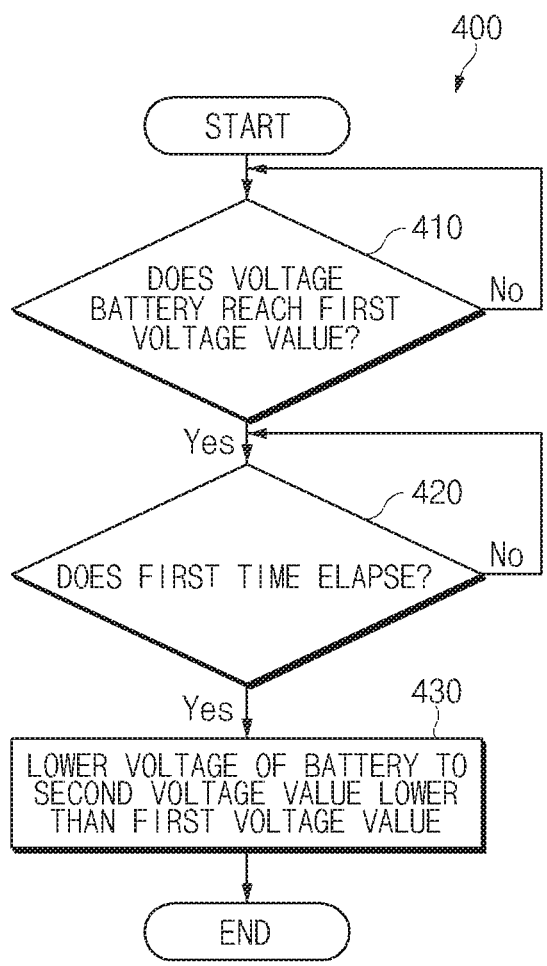
FIG. 6 is a flowchart of a method of controlling charging of an electronic device according to embodiment of the disclosure.

FIG. 6 is a flowchart of a method of controlling charging of an electronic device according to an embodiment of the disclosure.

Referring to FIG. 6, according to a method of controlling charging of an electronic device, the processor 120 of an electronic device (e.g., the electronic device 101 of FIG. 4) may monitor 400 a connection holding time between the power interface 320 and the external power source after the voltage of the battery 189 reaches a first voltage value corresponding to a fully-charged state. For example, when the connection holding time elapses longer than a first time, the processor 120 may lower a voltage of the battery 189 to a second voltage value lower than the first voltage value.

In operation 410, the processor 120 according to an embodiment may determine whether the voltage of the battery 189 reaches the first voltage value corresponding to a fully-charged state. In operation 410, when the voltage of the battery 189 reaches the first voltage value (410—Yes), the processor 120 may perform operation 420. In operation 410, when the voltage of the battery 189 does not reach the first voltage value (410—No), the processor 120 may perform operation 410 repeatedly.

In operation 420, the processor 120 according to an embodiment may determine whether a connection holding time has elapsed longer than a first time. In operation 420, the processor 120 may perform operation 430 when the connection holding time has elapsed longer than the first time (420—Yes). In operation 420, the processor 120 may repeatedly perform operation 420 when the connection holding time has not elapsed longer than the first time (420—No).

In operation 430, the processor 120 according to an embodiment may lower the voltage of the battery 189 to a second voltage value lower than the first voltage value by controlling the battery 189 to be switched to a discharge state. For example, the processor 120 may allow the battery 189 to be a discharge state by supplying a power of the battery 189 to at least one (e.g., the display 301 of the FIG. 4) of the components of the electronic device 101.

Figure 7:
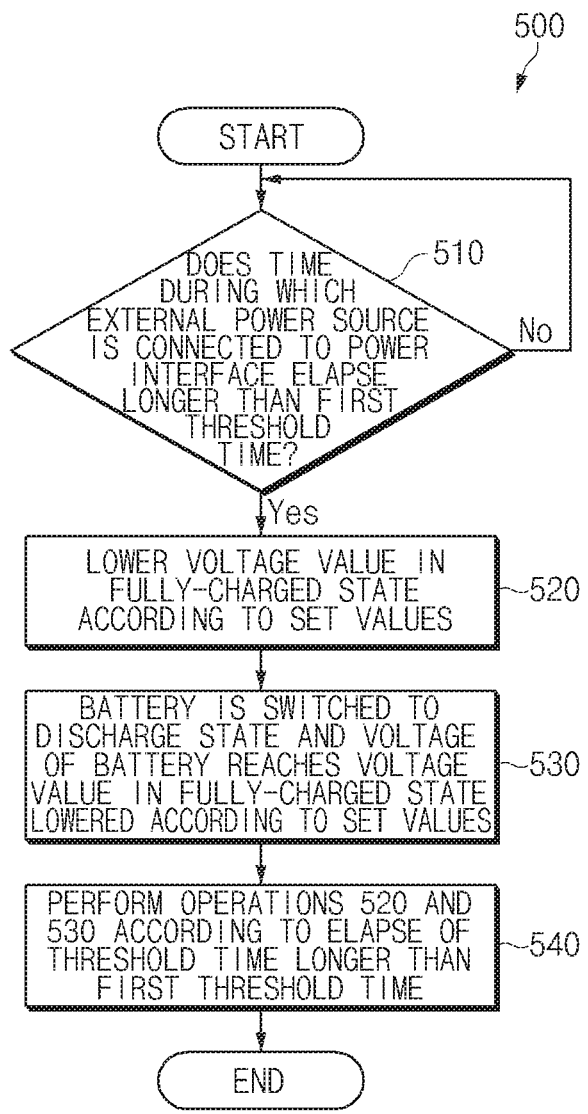
FIG. 7 is a flowchart of a method of controlling charging of an electronic device according to an embodiment of the disclosure.

FIG. 7 is a flowchart of a method of controlling charging of an electronic device according to an embodiment of the disclosure.

Referring to FIG. 7, according to a method of controlling charging of an electronic device, the processor 120 of an electronic device (e.g., the electronic device 101 of FIG. 4) may monitor 500 a connection holding time between the power interface 320 and the external power source after the voltage of the battery 189 reaches a voltage value corresponding to a fully-charged state. For example, the processor 120 may change a voltage value corresponding to a fully-charged state to set values at stage-wise fully-charged states when the connection holding time elapses longer than section-wise threshold times.

In operation 510, the processor 120 according to an embodiment may determine whether the connection holding time has elapsed longer than a first threshold time. For example, the processor 120 may measure the connection holding time after the voltage of the battery 189 reaches a voltage value corresponding to a first fully-charged state in a state in which the external power is connected to the power interface 320. In operation 510, the processor 120 may perform operation 520 when the connection holding time has elapsed longer than the first threshold time (510—Yes). In operation 510, the processor 120 may repeatedly perform operation 510 when the connection holding time have not elapsed longer than the first threshold time (510—No).

In operation 520, the processor 120 according to an embodiment may lower the voltage value corresponding to the fully-charged state in a stepwise manner according to the set values. For example, the processor 120 may lower the voltage value (e.g., 4.35 V) corresponding to the first fully-charged state to a first set value (e.g., 4.33 V).

In operation 530, the processor 120 according to an embodiment may control the power management module 188 such that the battery 189 is switched to a discharge state. For example, the processor 120 may enable the voltage of the battery 189 to reach a set value at a second fully-charged state, which is one-level lower than a voltage value in a first fully-charged state by supplying the voltage of the battery 189 to at least one of the components of the electronic device 101 (e.g., the display 301). For example, when a buck converter (e.g., the buck converter 188_1 of FIG. 5) is set to an OFF state, the battery 189 may be set to an ON state to generate a discharge current. A discharge current of the battery 189 generated according to the state of the buck converter 188_1 may be used as, for example, a load (or operation) of at least one of the components of the electronic device 101.

According to one embodiment, when the voltage of the battery 189 reaches a set value at the second fully-charged state, the processor 120 may control the power management module 188 such that the discharge state of the battery 189 is released. For example, the processor 120 may control the power management module 188 such that an external power supplied to the battery 189 is maintained to be blocked. In addition, when the voltage of the battery 189 reaches a set value at the second fully-charged state, the processor 120 may control the power management module 188 such that an external power is supplied to the display 301 or the processor 120.

In operation 540, the processor 120 according to an embodiment may repeatedly perform operations 520 and 530 according to whether the connection holding time has elapsed longer than a threshold time longer than the first threshold time.

According to one embodiment, whenever section-wise threshold times elapses sequentially, the processor 120 may lower a voltage value corresponding to the fully-charged state in a stepwise manner according to set values. For example, the processor 120 may control the power management module 188 such that the battery 189 is switched to a discharge state whenever the voltage of the battery 189 corresponds to set values at the stage-wise fully-charged states. For example, the processor 120 may allow the discharge state of the battery 189 to be released according to whether the voltage of the battery 189 reaches a voltage value of a fully-charged state, which is lowered according to the set values, according to a discharge state.

Figure 8A:
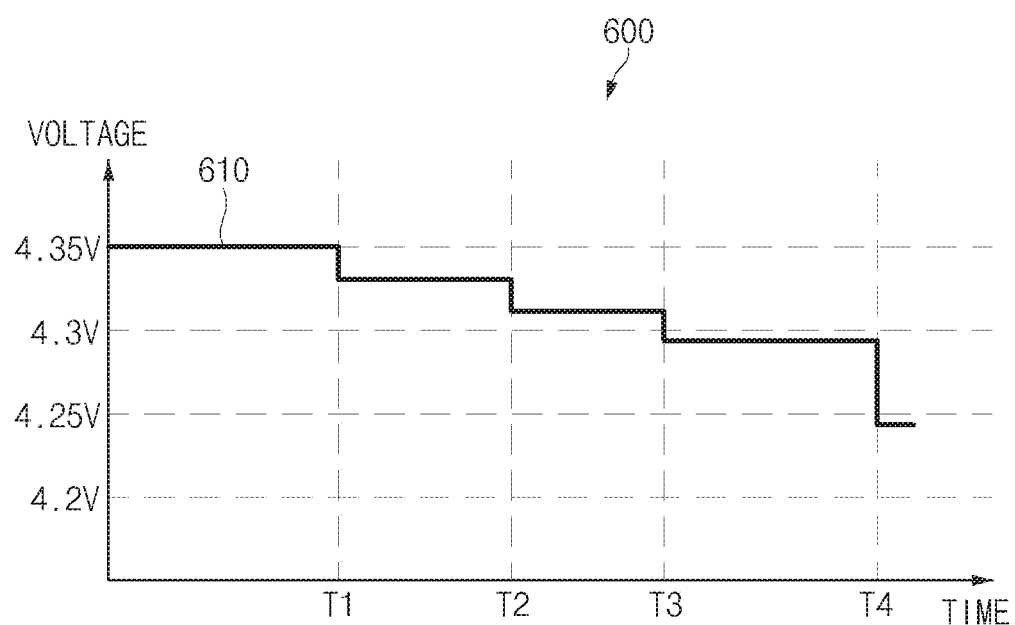
FIG. 8A is a graph of voltage values of an electronic device according to an embodiment of the disclosure.

FIG. 8A is a graph of voltage values of an electronic device according to an embodiment of the disclosure.

Figure 8B:
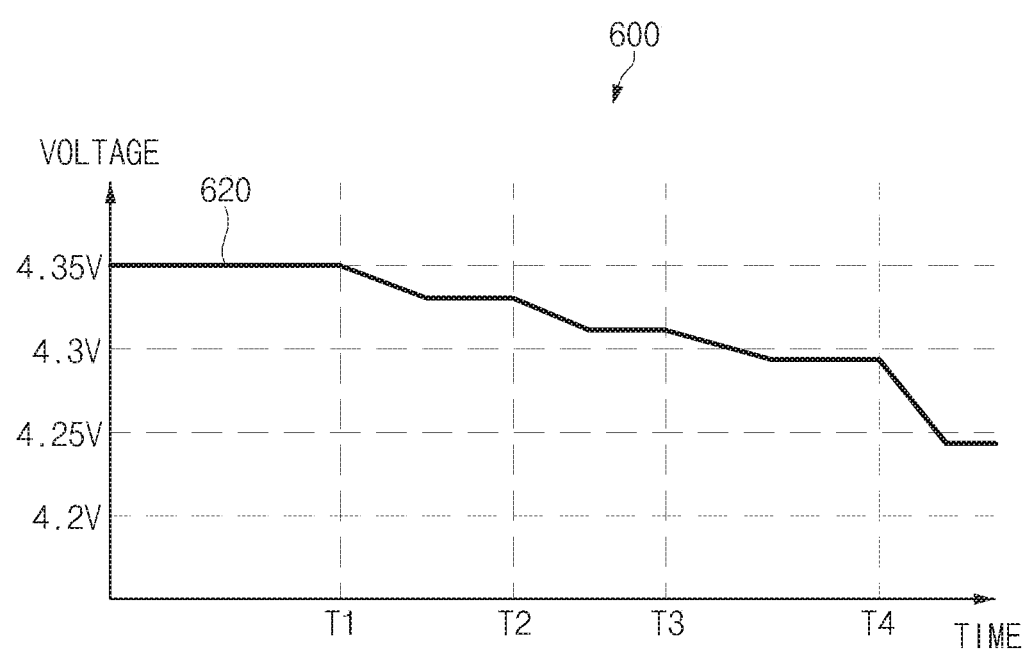
FIG. 8B is a graph of battery voltages of an electronic device according to an embodiment of the disclosure.

FIG. 8B is a graph of voltages of a battery of an electronic device according to an embodiment of the disclosure.

FIGS. 4, 8A, and 8B, a graph 600 according to an embodiment may include a change in a voltage value 610 in a fully-charged state, which is lowered in a stepwise manner whenever a connection holding time between the power interface 320 and an external power source elapses longer than section-wise threshold times (e.g., T1, T2, T3, and T4). For example, the connection holding time may be measured from a time point at which the voltage of the battery 189 reaches a voltage value corresponding to a first fully-charged state. According to an embodiment, the voltage graph 600 may include a change in a battery voltage 620 that is discharged according to the voltage value 610 in a fully-charged state that is lowered in a stepwise manner. The battery voltage 620 may be gradually lowered according to a change in the voltage value 610 changes as time elapses.

According to one embodiment, the battery voltage 620 may be raised up to a voltage value (for example, 4.35 V) corresponding to the first fully-charged state. For example, when the voltage of the battery 189 is lowered below a first charge-triggering voltage value (e.g., 4.28 V) corresponding to a voltage value of the first fully-charged state, the voltage of the battery 189 may be raised up to the voltage value corresponding to the first fully-charged state.

According to one embodiment, when the connection holding time elapses longer than a first threshold time T1, a voltage value corresponding to the first fully-charged state may be changed to a set value at a second fully-charged state (e.g., 4.33V), which is one-level lower than the voltage value (e.g., 4.35 V) of the first fully-charged state. For example, the battery voltage 620 may reach the set value at a second fully-charged state which is one-level lower than the voltage value of the first fully-charged state by supplying a discharge current to at least one of the components of the electronic device 101 (e.g., the display 301) in a state in which the external power supplied from the power management module 188 is blocked. For example, when the connection holding time elapses longer than the first threshold time T1, the first charge-triggering voltage value (for example, 4.28 V) corresponding to the first fully-charged state may be lowered to the second charge-triggering voltage value (e.g., 4.26 V) which is one-level lower than the first charge-triggering voltage value (e.g., 4.28 V).

According to one embodiment, when the connection holding time elapses longer than a second threshold time T2, a set value corresponding to the second fully-charged state (e.g., 4.33 V) may be changed to a set value at a third fully-charged state (e.g., 4.31 V), which is one-level lower than the voltage value (e.g., 4.33 V) of the second fully-charged state. For example, the battery voltage 620 may reach the set value at the third fully-charged state which is one-level lower than the set value at the second fully-charged state by supplying a discharge current to at least one of the components of the electronic device 101 (e.g., the display 301) in a state in which the external power supplied from the power management module 188 is blocked. For example, when the connection holding time elapses longer than the second threshold time T2, the second charge-triggering voltage value (for example, 4.26 V) corresponding to the second fully-charged state may be lowered to the third charge-triggering voltage value (e.g., 4.24 V) which is one-level lower than the second charge-triggering voltage value (e.g., 4.26 V).

According to one embodiment, when the connection holding time elapses longer than a third threshold time T3, a set value corresponding to the third fully-charged state (e.g., 4.31 V) may be changed to a set value at a fourth fully-charged state (e.g., 4.29 V), which is one-level lower than the voltage value of the third charge-triggering voltage value. For example, the battery voltage 620 may reach the set value at a fourth fully-charged state which is one-level lower than the set value at the third fully-charged state by supplying a discharge current to at least one of the components of the electronic device 101 (e.g., the display 301) in a state in which the external power supplied from the power management module 188 is blocked. For example, when the connection holding time elapses longer than the third threshold time T3, the third charge-triggering voltage value (for example, 4.24 V) corresponding to the third fully-charged state may be lowered to a fourth charge-triggering voltage value (e.g., 4.22 V) which is one-level lower than the third charge-triggering voltage value (e.g., 4.24 V).

According to one embodiment, when the connection holding time elapses longer than a fourth threshold time T4, a set value corresponding to the fourth fully-charged state (e.g., 4.29 V) may be changed to a set value at a fifth fully-charged state (e.g., 4.24 V), which is one-level lower than the voltage value of the fourth charge-triggering voltage value. For example, the voltage of the battery 189 may reach a set value at a fifth fully-charged state which is one-level lower than the set value at the fourth fully-charged state by supplying a discharge current to at least one of the components of the electronic device 101 (e.g., the display 301) in a state in which the external power supplied from the power management module 188 is blocked. For example, when the connection holding time elapses longer than the fourth threshold time T4, the fourth charge-triggering voltage value (for example, 4.22 V) corresponding to the fourth fully-charged state may be lowered to a fifth charge-triggering voltage value (e.g., 4.17 V) which is one-level lower than the fourth charge-triggering voltage value (e.g., 4.22 V).

Figure 9:
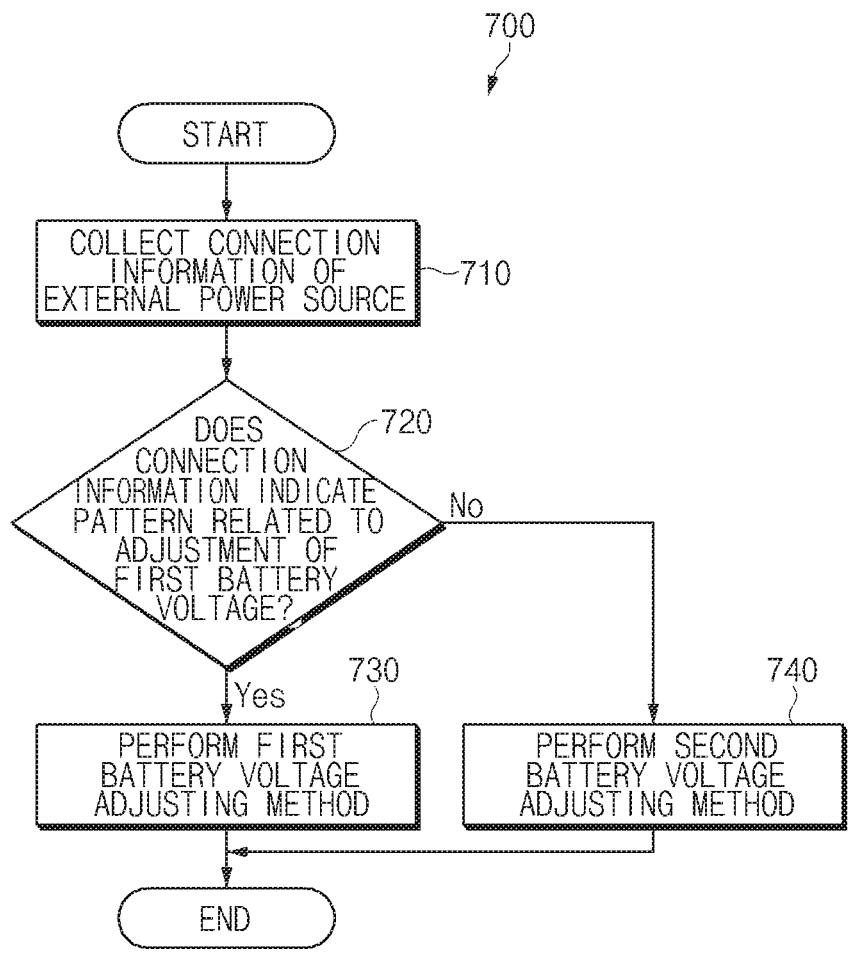
FIG. 9 is a flowchart of a method of controlling charging of an electronic device according to a purpose of use according to an embodiment of the disclosure.

FIG. 9 is a flowchart of a method of controlling charging of an electronic device according to a purpose of use according to an embodiment of the disclosure.

Referring to FIG. 9, according to a method of controlling charging of an electronic device, the processor 120 of the electronic device (e.g., the electronic device 101 of FIG. 4)

may perform a battery voltage adjusting method 700 according to a result of collecting connection information. The connection information may include, for example, a connection holding time between the power interface 320 (e.g., the power interface 320 of FIG. 4) and an external power source.

In operation 710, the processor 120 according to an embodiment may collect the connection information so as to correspond to date information (e.g., weekend or weekday). For example, the processor 120 may accumulate and collect pieces of connection information that are classified according to weekend or weekday.

In operation 720, the processor 120 according to an embodiment may determine whether the pattern of the connection information accumulated is a pattern related to first battery voltage adjustment (e.g., a pattern in which the connection information is collected on the weekend). In operation 720, when it is determined that the pattern of the connection information is the pattern related to the first battery voltage adjustment (720—Yes), the processor 120 may perform operation 730. In operation 720, when it is determined that the pattern of the connection information is not the pattern related to the first battery voltage adjustment (720—No), the processor 120 may perform operation 740.

In operation 730, the processor 120 according to an embodiment may perform a first battery voltage adjusting method used in the electronic device 101 for a personal purpose. According to one embodiment, the processor 120 may change a voltage value and a charge-triggering voltage value which correspond to the fully-charged state of the battery 189, according to the first battery voltage adjusting method. For example, the processor 120 may allow a voltage value corresponding to the fully-charged state to be lowered in a stepwise manner according to a set value whenever the connection holding time elapses longer than threshold times for each section by performing the first battery voltage adjusting method. In addition, the processor 120 may allow a charge-triggering voltage value to be lowered in a stepwise manner according to a change in a voltage value corresponding to the fully-charged state whenever the connection holding time elapses longer than threshold times for each section by performing the first battery voltage adjusting method.

In operation 740, the processor 120 according to an embodiment may perform a second battery voltage adjusting method used in the electronic device 101 for a business purpose. The second battery voltage adjusting method may include a section threshold time, which corresponds to a threshold time shorter than threshold times for sections in the first battery voltage adjusting method. For example, the processor 120 may allow a voltage value corresponding to the fully-charged state to be lowered in a stepwise manner according to a set value whenever the connection holding time elapses longer than threshold times for each section by performing the second battery voltage adjusting method. In addition, the processor 120 may allow a charge-triggering voltage value to be lowered in a stepwise manner according to a change in a voltage value corresponding to the fully-charged state whenever the connection holding time elapses longer than threshold times for each section by performing the second battery voltage adjusting method.

According to one embodiment, a battery voltage adjusting method 700 according to the purpose of use may be given as the example of Table 2. Table 2 below shows stage-wise set values at the fully-charged states according to the section-wise threshold times.

TABLE 2

| | | | | | |
|---|---|---|---|---|---|
| First battery voltage adjusting method | Threshold time (seconds) | 51,840 | 69,120 | 120,960 | 172,800 |
| | Set value at fully-charged state (V) | 4.33 | 4.31 | 4.29 | 4.24 |
| Second battery voltage adjusting method | Threshold time (seconds) | 8,640 | 17,280 | 34,560 | 51,840 |
| | Set value at fully-charged state (V) | 4.33 | 4.31 | 4.29 | 4.24 |

Referring to Table 2, the processor 120 according to an embodiment may perform the first battery voltage adjusting method to allow a voltage value at a fully-charged state to reach set values at the stage-wise fully-charged states from a voltage value (e.g., 4.35 V) at a first fully-charged state. According to another embodiment, the processor 120 may perform the second battery voltage adjusting method, such that a voltage value at the first fully-charged state reaches voltages at stage-wise fully-charged states from the first fully-charged voltage according to section-wise threshold times which are shorter than section-wise threshold times of the first battery voltage adjusting method.

According to various embodiments, the processor 120 may include different section-wise threshold times as shown in Table 2, depending on whether an external power source is connected to the power interface 320 through specific means. According to one embodiment, the electronic device 101 may differently perform the first battery voltage adjusting method and the second battery voltage adjusting method according to whether the external power source is a Micro-B type terminal and/or a USB Type-C terminal. For example, the processor 120 may identify the Micro-B type terminal by using a resistance value of a USB ID pin. For example, the processor 120 may identify the USB Type-C terminal through communication between PD ICs.

According to various embodiments, the processor 120 may include different section-wise threshold times as shown in Table 2 according to an environment in which a specific temperature is kept. According to one embodiment, the electronic device 101 may differently perform the first battery voltage adjusting method and the second battery voltage adjusting method according to whether a temperature of 35 degrees is kept for a predetermined time or more.

An electronic device (e.g., the electronic device 101) according to the above-described various embodiments may include a housing (e.g., the housing 310 of FIG. 4), a power interface (e.g., the power interface 320 of FIG. 4) exposed through at least a portion of the housing to be connected to an external power source in a wired manner or disposed inside the housing to be connected to the external power source in a wireless manner, at least one battery (e.g., the battery 189 of FIG. 4) disposed inside the housing and electrically connected to the power interface, a processor (e.g., the processor 120 of FIG. 4) disposed inside the housing and operatively connected to the power interface, and a memory (e.g., the memory 130 of FIG. 4) disposed inside the housing and operatively connected to the processor. The memory stores instructions that, when executed, causes the processor to lower a voltage of the battery to a second voltage value lower than the first voltage value by discharging the battery after a first time has elapsed from a time point at which the voltage of the battery reaches the first voltage value when the voltage of the battery reaches the first voltage value in a state in which the external power is supplied through the power interface.

According to various embodiments, the first voltage value may be a value of a voltage of the battery when the battery is in a fully-charged state.

According to various embodiments, the electronic device may further include a display (e.g., the display 301 of FIG. 4). The instructions may cause the processor to supply the external power to the display or the processor when the voltage of the battery is the first voltage value, and electrically connect the battery to the display or the processor to perform discharge when the first time elapses longer than a threshold value of the first time.

According to various embodiments, the electronic device may further include a power management integrated circuit (PMIC) (e.g., the power management module 188 of FIG. 4). The instructions may cause the processor to supply the external power to the display or the processor through the PMIC.

According to various embodiments, the instructions may cause the processor to electrically connect the external power to the display or the processor through the PMIC.

An electronic device (e.g., the electronic device 101) according to the above-described embodiments may include a housing (e.g., the housing 310 of FIG. 4), a power interface (e.g., the power interface 320 of FIG. 4) connected to an external power source through the housing, a power management module (e.g., the power management module 188 of FIG. 4) electrically connected to the power interface, at least one battery (e.g., the battery 189 of FIG. 4) that is charged by an external power supplied through the power management module, a processor (e.g., the processor 120 of FIG. 4) operatively connected to the power interface, and a memory (e.g., the memory 130 of FIG. 4) that stores instructions. The processor may, when the instructions are executed, lower a voltage value corresponding to a fully-charged state according to set values in a stepwise manner whenever a connection holding time of connection between the power interface and the external power source elapses section-wise threshold times after a voltage of the battery reaches a voltage value at the fully-charged state in a state in which the external power source is connected to the power interface.

According to various embodiments, the processor may, when the instructions are executed, allow the power management module to block the external power supplied to the battery and switch the battery to a charge state.

According to various embodiments, the electronic device may further include a display (e.g., the display of FIG. 4) that is operated by at least one of the external power supplied through the power management module and a discharge current supplied from the battery. The processor may, when the instructions are executed, allow the power management module to block the external power supplied to the display or the processor.

According to various embodiments, the processor may, when the instructions are executed, allow the power management module to release a discharge state of the battery when the voltage of the battery, which has reached the voltage value corresponding to the fully-charged state, reaches a voltage value at a fully-charged state, which is lowered according to set values.

According to various embodiments, the processor may, when the instructions are executed, allow the power management module to supply the external power to the display or the processor in a state in which the external power supplied to the battery is blocked when the discharge state is released.

A method of controlling charging of a battery, according to the above-described embodiments, may include determining whether a connection holding time of connection between a power interface and an external power source has elapsed longer than section-wise threshold times after a voltage of the battery (e.g., the battery 189 of FIG. 4) reaches a voltage value corresponding to a fully-charged state in a state in which the external power source is connected to the power interface (e.g., the power interface 320 of FIG. 4), and lowering the voltage value corresponding to the fully-charged state according to set values in a stepwise manner whenever the connection holding time elapses longer than the section-wise threshold times.

According to various embodiments, the method may further include determining whether the voltage of the battery corresponds to the voltage value at the fully-charged state whenever the connection holding time elapses longer than the section-wise threshold times.

According to various embodiments, the method may further include allowing a power management module to block the external power supplied to the battery.

According to various embodiments, the method may further include allowing a power management module to switch the battery to a discharge state in a state in which the battery is connected to a display (e.g., the display 301 of FIG. 4) or a processor (e.g., the processor 120 of FIG. 4).

According to various embodiments, the method may further include controlling a power management module such that the voltage of the battery reaches a set value one-level lower than the voltage value corresponding to the fully-charged state.

According to various embodiments, the method may further include allowing the power management module to release the discharge state of the battery when the voltage of the battery, which corresponds to the voltage value at the fully-charged state, reaches a voltage value at a fully-charged state, which is lowered according to set values.

According to various embodiments, the method may further include allowing the power management module to supply the external power to the display or the processor when the discharge state is released.

According to various embodiments, the method may further include continuously accumulating the connection holding time when the power interface is separated from the external power source and is then connected to the external power source within a set time.

According to various embodiments, the method may further include continuously accumulating the connection holding time when the power interface is separated from the external power source and is then connected to the external power source in a state in which the voltage of the battery is not lowered below a set voltage.

According to various embodiments, the method may further include continuously accumulating the connection holding time when the power interface is separated from the external power source and is then connected to the external power source in a state in which a voltage level of the battery is not lowered below a set level.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments disclosed in the disclosure, it is possible to prevent heat generation, life shortening, and/or swelling of the battery by controlling the charging of the battery according to conditions for the charging of the battery which is continuously performed by an external power source.

In addition, various effects may be provided that are directly or indirectly understood through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a housing;
   a power interface exposed through at least a portion of the housing to be connected to an external power source in a wired manner or disposed inside the housing to be connected to the external power source in a wireless manner;
   a battery disposed inside the housing and electrically connected to the power interface;

a processor disposed inside the housing and operatively connected to the power interface; and
a memory disposed inside the housing and operatively connected to the processor,
wherein the memory stores instructions that, when executed, cause the processor to:
determine whether the battery is in a charge state in which an external power generated from the external power source is supplied through the power interface,
while the battery is in the charge state, determine whether a voltage of the battery reaches a first voltage level corresponding to a fully-charged state,
after the voltage of the battery reaches the first voltage level, determine whether a connection holding time between the power interface and the external power source has elapsed longer than a plurality of section-wise threshold times, and
after each of the plurality of section-wise threshold times have elapsed, lower the voltage of the battery by a step-wise level.

2. The electronic device of claim 1, further comprising:
a display,
wherein the instructions, when executed, further cause the processor to:
supply the external power to the display when the voltage of the battery reaches the first voltage value, and
electrically connect the battery to the display to perform discharge when the connection holding time elapses longer than each of the plurality of section-wise threshold times.

3. The electronic device of claim 2, further comprising:
a power management integrated circuit (PMIC),
wherein the instructions, when executed, further cause the processor to supply the external power to the display through the PMIC.

4. The electronic device of claim 3, wherein the instructions cause the processor to electrically connect the external power to the display through the PMIC.

5. An electronic device comprising:
a housing;
a power interface connected to an external power source through the housing;
a power management module electrically connected to the power interface;
a battery configured to be charged by an external power supplied through the power management module;
a processor operatively connected to the power interface; and
a memory configured to store instructions,
wherein, when the instructions are executed, the processor is configured to:
determine whether the battery is in a charge state in which an external power generated from the external power source is supplied through the power interface,
while the battery is in the charge state, determine whether a voltage of the battery reaches a first voltage level corresponding to a fully-charged state,
after the voltage of the battery reaches the first voltage level, determine whether a connection holding time between the power interface and the external power source has elapsed longer than a plurality of section-wise threshold times, and
after each of the plurality of section-wise threshold times have elapsed, lower a voltage value corresponding to the fully-charged state according to a plurality of pre-determined values in a stepwise manner.

6. The electronic device of claim 5, wherein, when the instructions are executed, the processor is further configured to, when the instructions are executed, allow the power management module to block the external power supplied to the battery and switch the battery to a charge state.

7. The electronic device of claim 5, further comprising:
a display configured to be operated by at least one of the external power supplied through the power management module and a discharge current supplied from the battery,
wherein, when the instructions are executed, the processor is further configured to allow the power management module to block the external power source supplied to the display.

8. The electronic device of claim 5, wherein, when the instructions are executed, the processor is further configured to allow the power management module to release a discharge state of the battery when the voltage of the battery, which has reached the voltage value corresponding to the fully-charged state, reaches a voltage value at the fully-charged state, which is lowered according to each of the plurality of pre-determined values.

9. The electronic device of claim 8, wherein, when the instructions are executed, the processor is further configured to allow the power management module to supply the external power to a display in a state in which the external power supplied to the battery is blocked when the discharge state is released.

10. A method of controlling charging of a battery, the method comprising:
determining whether the battery is in a charge state in which an external power generated from an external power source is supplied through a power interface;
while the battery is in the charge state, determining whether a voltage of the battery reaches a first voltage level corresponding to a fully-charged state;
after the voltage of the battery reaches the first voltage level, determining whether a connection holding time between the power interface and the external power source has elapsed longer than a plurality of section-wise threshold times; and
after each of the plurality of section-wise threshold times have elapsed, lowering a voltage value corresponding to the fully-charged state according to a plurality of pre-determined values in a stepwise manner.

11. The method of claim 10, further comprising:
determining whether the voltage of the battery corresponds to the voltage value at the fully-charged state whenever the connection holding time elapses longer than each of the plurality of section-wise threshold times.

12. The method of claim 10, further comprising:
allowing a power management module to block the external power supplied to the battery.

13. The method of claim 10, further comprising:
allowing a power management module to switch the battery to a discharge state in a state in which the battery is connected to a display.

14. The method of claim 10, further comprising:
controlling a power management module such that the voltage of the battery reaches a set value one-level lower than the voltage value corresponding to the fully-charged state.

15. The method of claim 13, further comprising:
allowing the power management module to release the discharge state of the battery when the voltage of the battery, which corresponds to the voltage value at the fully-charged state, reaches a voltage value at a fully-charged state, which is lowered according to the plurality of pre-determined values.

16. The method of claim 15, further comprising:
allowing the power management module to supply an external power to the display when the discharge state is released.

17. The method of claim 10, further comprising:
continuously accumulating the connection holding time when the power interface is separated from the external power source and is then connected to the external power source within a set time.

18. The method of claim 10, further comprising:
continuously accumulating the connection holding time when the power interface is separated from the external power source and is then connected to the external power source in a state in which the voltage of the battery is not lowered below a set voltage.

19. The method of claim 10, further comprising:
continuously accumulating the connection holding time when the power interface is separated from the external power source and is then connected to the external power source in a state in which a voltage level of the battery is not lowered below a set level.

20. The method of claim 10, wherein the connection holding time is measured from a time point at which the voltage of the battery reaches a voltage value corresponding to a first fully-charged state.

21. The method of claim 20, wherein, when the connection holding time elapses longer than a first threshold time, a voltage value corresponding to the first fully-charged state may be changed to a set value at a second fully-charged state, which is one-level lower than the voltage value of the first fully-charged state.

22. The method of claim 10, wherein the voltage of the battery is gradually lowered according to a change in the voltage value as time elapses.

* * * * *